(No Model.)

W. B. CHOATE.
SOLDERING IRON.

No. 294,364. Patented Mar. 4, 1884.

WITNESSES
Chas. R. Abell
W. Chaffee

INVENTOR
William B. Choate.
By
John J. Halsted & Son
His Attorneys

UNITED STATES PATENT OFFICE.

WILLIAM B. CHOATE, OF AURORA, ILLINOIS.

SOLDERING-IRON.

SPECIFICATION forming part of Letters Patent No. 294,364, dated March 4, 1884.

Application filed November 2, 1883. (No model.)

*To all whom it may concern:*

Be it known that I, WILLIAM B. CHOATE, of Aurora, in the county of Kane and State of Illinois, have invented certain new and useful Improvements in Soldering-Tools; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The main object of my invention is to afford means whereby the soldering "copper" or iron may be readily adjusted and held at any desired angle.

Figure 1:
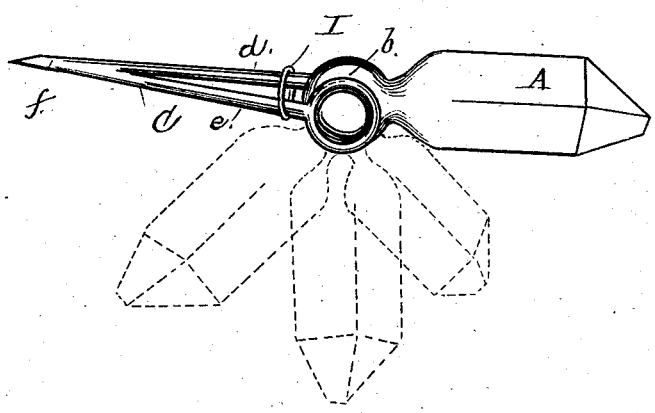
Figure 2:
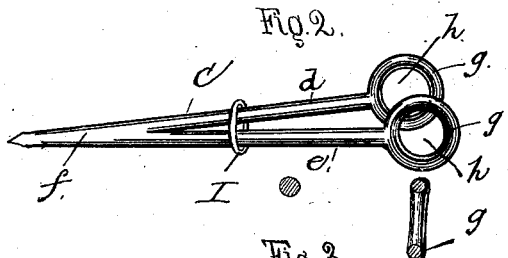
Figure 3:
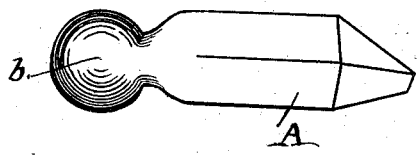

The invention will plainly appear from the following:

Figure 1 represents a soldering-tool made in accordance with my invention, the iron or "copper," so called, being shown also in several positions in dotted lines. Fig. 2 is a detached view of the spring-shank and its gripping-rings and adjustable tightening-slide, and Fig. 3 a detached view of the iron.

A is the iron or copper by which the soldering is done, and it may be of any customary or desired shape at its outer or working end; but at the end or part by which it is connected to its shank it has a ball, $b$, to permit its being turned around to any desired position in its clamping spring shank or holder C. This shank C is made with two diverging prongs or parts, $d$ and $e$, but all either made in a single piece of malleable cast-iron, which I prefer, or, if made in two pieces, they are united or welded together at that end, $f$, which is to be driven into the handle of the implement. These parts $d$ and $e$ are round or cylindrical in cross-section, and each at its other end terminates in a ring or grasping portion, $g$, each therefore having a large hole, $h$, through it. These holes are of less diameter than the diameter of the ball $b$, so as to be able to receive and hold the ball between them. A loose slide-ring, I, is placed over the shank, and when the ball of the iron is placed between these spring gripping parts $d$ and $e$, this ring is moved outward or toward the ball, and closes them tightly upon the ball, and it is ready for use. By sliding back the ring I the bit or iron may be inserted between the parts $g$ $g$ and secured firmly enough by means of this ring. The iron may then be turned in any direction to any requisite position relatively to its shank, and held to such position by this ring, the friction between the ball and the annular sockets $g$ $g$ being sufficient to keep the bit A in position and to permit changes of its position without change of the position of the ring I. It will be seen that the range of motion and of adjustment not only affords all the changes of position which can be effected by a pivoted or swiveled iron supported on journals—that is, all in a given single plane—but my construction has also the advantage of being adjustable in any and every plane, thus giving to the tool practical provision for a universal adjustment, and this permits its adaptation for work of all kinds, and where the soldering is to be done in unusual or peculiar places, and where the implements as now made could only be used with great difficulty, if at all.

I claim—

1. A soldering copper or iron having a ball-head, in combination with a spring-shank adapted to grip and hold such head, and to permit its adjustment therein.

2. In combination, the iron made with a ball-head, the shank C, having the described arms $d$ and $e$, united at one end, and each having its other or gripping ends made annular, and a slide, $h$, on said shank, all substantially as set forth.

WILLIAM B. CHOATE.

Witnesses:
A. G. McDOLE,
A. E. SEARLES.